(12) United States Patent
Saito et al.

(10) Patent No.: US 8,112,500 B2
(45) Date of Patent: Feb. 7, 2012

(54) TECHNIQUE OF RELAYING COMMUNICATIONS BETWEEN CLIENT APPARATUS AND SERVER APPARATUS

(75) Inventors: Shin Saito, Kanagawa-ken (JP); Hisashi Miyashita, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 438 days.

(21) Appl. No.: 12/175,746

(22) Filed: Jul. 18, 2008

(65) Prior Publication Data
US 2009/0030996 A1 Jan. 29, 2009

(30) Foreign Application Priority Data
Jul. 26, 2007 (JP) ................................. 2007-194091

(51) Int. Cl.
*G06F 15/16* (2006.01)
(52) U.S. Cl. ....................................... 709/218; 709/219
(58) Field of Classification Search .................. 709/203, 709/205, 216, 231, 244, 246, 218, 219; 725/9; 726/12
See application file for complete search history.

(56) References Cited

U.S. PATENT DOCUMENTS

| | | | |
|---|---|---|---|
| 6,112,228 A * | 8/2000 | Earl et al. ...................... 709/205 |
| 6,345,314 B1 * | 2/2002 | Cole et al. ..................... 719/316 |
| 6,944,660 B2 * | 9/2005 | Eshghi et al. ................. 709/224 |
| 2002/0116407 A1 * | 8/2002 | Negishi et al. ................ 707/203 |
| 2002/0156909 A1 * | 10/2002 | Harrington .................... 709/231 |
| 2003/0182424 A1 * | 9/2003 | Odendahl ...................... 709/225 |
| 2003/0229718 A1 * | 12/2003 | Tock et al. ..................... 709/246 |
| 2004/0172253 A1 * | 9/2004 | Singh ......................... 704/270.1 |
| 2004/0221034 A1 * | 11/2004 | Kausik et al. ................. 709/224 |
| 2005/0188007 A1 * | 8/2005 | Warner et al. ................. 709/203 |
| 2007/0220599 A1 * | 9/2007 | Moen et al. ...................... 726/12 |
| 2007/0250618 A1 * | 10/2007 | Hammond .................... 709/224 |
| 2008/0005173 A1 * | 1/2008 | Wilson et al. ............... 707/104.1 |
| 2008/0195692 A1 * | 8/2008 | Hayosh et al. ................ 709/202 |
| 2008/0209324 A1 * | 8/2008 | Matsuo ......................... 715/719 |

FOREIGN PATENT DOCUMENTS
EP 1026608 A2 * 8/2000

OTHER PUBLICATIONS

Shin Saito et al, Transforming Flash to XML for Accessibility Evaluations, ASSETS'06, Oct. 22-25, 2006, p. 157-164, Tokyo Research Laboratory, IBM Research, Portland, Oregon, USA.

* cited by examiner

*Primary Examiner* — Joshua Joo
*Assistant Examiner* — Jonathan Willis
(74) *Attorney, Agent, or Firm* — Suiter Swantz pc llo (57) ABSTRACT

A relay system for obtaining a program from a server and returning the program to a client by forwarding a message received from a client to the server.

10 Claims, 8 Drawing Sheets

| DESTINATION URL | CASH FILE |
|---|---|
| ⋮ | ⋮ |
| http://△△△.com/foo.swf | foo.swf |
| ⋮ | ⋮ |
| http://○○○.com/bar.swf | bar.swf |
| ⋮ | ⋮ |

```
1:for (prop in this) {
2:   object.prototype[prop] = this[prop] ;
3:}
4:
5:// load the original
6:loadMovieNum(this._url, 0, "POST") ;
7:// load boot_bridge.swf
8:loadMovieNum(getSameDomainURL(this._url, "URL OF MONITOR PROGRAM"), 53553") ;
```

```
1:System.security.allowDomain("*");
2:_root.watch("IBM_AR_request_args", IBM_AR_processRequest);
3:
4:function IBM_AR_processRequest(propName, oldVal, newVal, userData) {
5:      var args = ASSerializer.deserialize(newVal);
6:      var name = args.shift();
7:      var method:Function = Init.callbacks[name];
8:      var retObj = method.apply(null, args);
9:      _root.IBM_AR_response_value = ASSerializer.seriarize(retObj);
10:     return oldVal;
11: }
```

TECHNIQUE OF RELAYING COMMUNICATIONS BETWEEN CLIENT APPARATUS AND SERVER APPARATUS

CROSS-REFERENCE TO RELATED APPLICATIONS

The present application claims the benefit under 35 U.S.C. §119 of Japan; Application Serial Number 2007-194091, filed Jul. 26, 2007, entitled TECHNIQUE OF RELAYING COMMUNICATIONS BETWEEN CLIENT APPARATUS AND SERVER APPARATUS, which is incorporated herein by reference.

BACKGROUND OF THE INVENTION

The present invention relates to a technique of relaying communications between a client apparatus and a server apparatus. In particular, the present invention relates to a technique of relaying a message transmitted for the purpose of obtaining a program.

A mash up is a technique for generating a new application program in such a way that software modules open to the public on the Internet are combined with each other, and the studies for the mash up have been in progress in recent years. In order to implement a mash up, it is desirable that a certain software module be allowed to refer to or to modify an object in another software module. However, there are some released software modules each containing an object whose interface for access or whose source file is undisclosed. In this case, such a software module is difficult to use for a mash up. [Non-Patent Document 1] Saito, S., Takagi, H. and Asakawa,
  C. 2006. Transforming Flash to XML for Accessibility Evaluations. In Proceedings of the 8th international ACM SIGACCESS conference on Computers and Accessibility (Portland, Oreg., USA, Oct. 23-25, 2006). Assets '06. ACM Press, New York, N.Y., 157-164.

To address this case, an idea has been proposed that a compiled program is decompiled first☐and then a command to refer to an object in the original compiled program is inserted into the decompiled program (see the above non-patent document 1). There is a case, however, where license agreements prohibit some programs from being decompiled. For this reason, this technique is not applicable to such programs. Moreover, since decompiling requires a relatively long processing time, users probably have to wait for a long time when the users attempt to execute a program.

SUMMARY OF THE INVENTION

Against this background, an object of the present invention is to provide a relay apparatus, system and method that can solve the forgoing problems. The object is achieved by a combination of the features recited in the independent claims of the scope of claims. In addition, the dependent claims define more advantageous specific examples of the present invention.

In order to solve the foregoing problems, a first aspect of the present invention provides a relay apparatus that obtains a program from a server apparatus and returns the obtained program to the client apparatus by forwarding a message received from a client apparatus to the server apparatus. The relay apparatus includes a receiving unit, a first reply section and a second reply section. Instead of the server apparatus, the receiving unit receives a message from the client apparatus, the message making a request to the server apparatus for a program to be operated in the client apparatus. In response to a receipt of a first message requesting a first program, the first reply section causes the client apparatus to execute a load program by returning the load program, instead of returning a first program, to the client apparatus in response to a receipt of a first message requesting the first program. The load program requesting the first program and a monitor program for monitoring the first program. Here, the load program is one requesting the first program and a monitor program for monitoring the first program. On condition that a received second message requests the monitor program, the second reply section causes the client apparatus to execute the monitor program by returning a previously stored monitor program to the client apparatus, instead of performing processing of obtaining the monitor program from the server apparatus and returning the monitor program. In addition, also provided are a program and a method for causing a computer to function as the relay apparatus.

Note that the foregoing outline of the present invention is not an enumerated list including all of the necessary features of the present invention, and any sub-combination of these features may be included in the present invention.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Hereinafter, the present invention will be described through an embodiment of the present invention. Note that the following embodiment is not intended to limit to the invention according to the scope of claims, and that the entire combination of features explained in the embodiment is not always necessary for solving means of the present invention.

Figure 1:
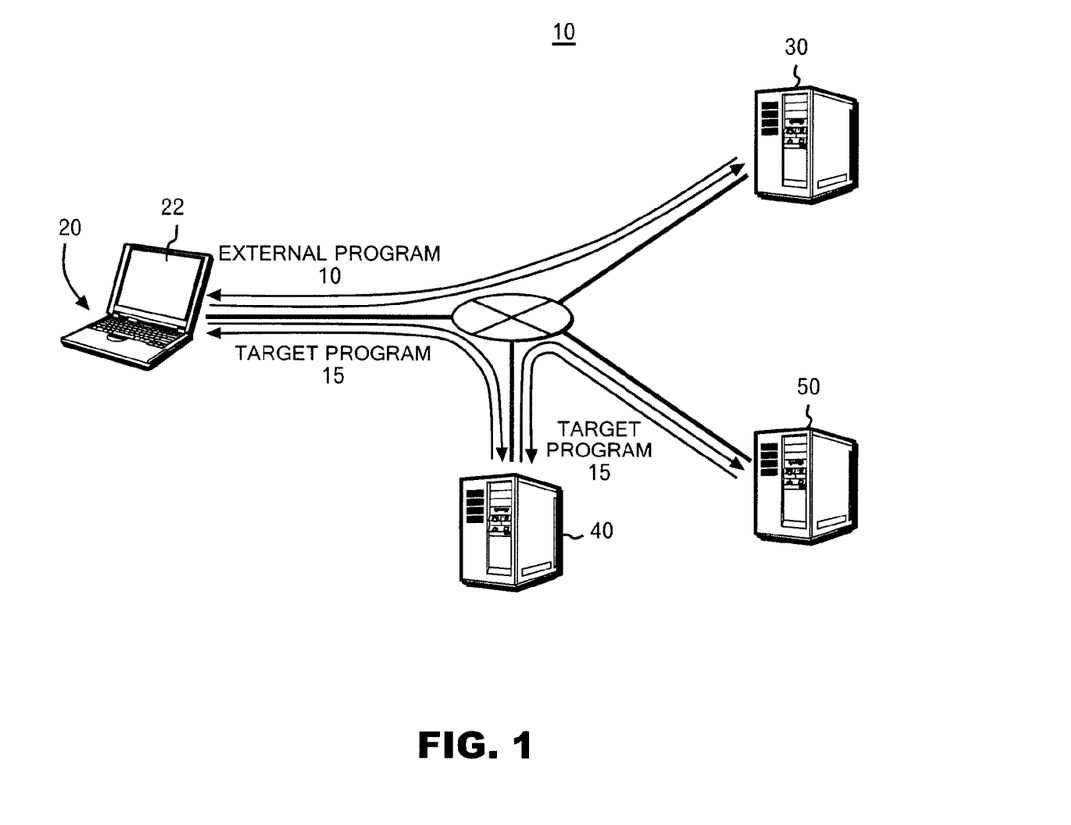
FIG. 1 shows an entire configuration of an information system 10 according to an embodiment.

FIG. 1 shows an entire configuration of an information system 10 according to this embodiment. The information system 10 includes a client apparatus 20, a server apparatus 30, a relay apparatus 40 and a server apparatus 50 which are connected to one another via electric communication lines. The client apparatus 20 allows, for example, a Web browser to operate, and receives operations of a pointing device or input operations of a keyboard from a user. The server apparatus 30 is controlled, for example, by a software vendor and provides a user with software requested by the user. The relay apparatus 40 is an apparatus called, for example, a proxy server, and plays a role of relaying communications between the client apparatus 20 and the server apparatus 50. The server apparatus 50 builds a Web site, for example, and provides a user with Hypertext Mark-up Language (HTML) documents and other files requested by the user.

In response to an operation of a user, the client apparatus 20 transmits a message making a request for an external program 12 to the server apparatus 30. This message is in conformity with, for example, Hypertext Transfer Protocol (HTTP). In response to this, the server apparatus 30 causes the client apparatus 20 to execute the external program 12 by returning the external program 12 to the client apparatus 20. The external program 12 may include a program, such as an ActiveX (registered trademark) control, executable by the Web browser, for example. In this case, the client apparatus 20 displays an output of the external program 12 inside a screen of the Web browser by executing the external program 12. A component for displaying this Web browser in the client apparatus 20 is called a display unit 22.

Moreover, the client apparatus 20 renders an HTML file obtained from the server apparatus 50, and displays its content on the display unit 22. The rendering of an HTML file means displaying texts, images and the like, which are defined in the HTML file, in certain formats (for example, the size, font and display position of characters for a text, and the size and compression rate for an image) according to the HTML tags. In some cases, the client apparatus 20 has to obtain a program from the server apparatus 50 as a result of rendering an HTML file or as a result of the Web browser's receipt of an operation from a user. The obtained program is executed by the client apparatus 20. Incidentally, this program is one example of a first program according to the present invention. This program is called a target program 15 below, since the program is a target for the later-described analysis.

In this case, the client apparatus 20 transmits a message making a request for the target program 15 to the server apparatus 50 via the relay apparatus 40. This message may be in conformity with HTTP as well. In response to this, the server apparatus 50 causes the client apparatus 20 to execute the target program 15 by returning the target program 15 to the client apparatus 20 via the relay apparatus 40. The target program 15 is a program for displaying a moving image or a still image on a screen of a Web browser (including a Web browser with a Flash Player installed as a plug-in), for example, like a program recorded in a SWF file that provides a movie clip of Flash of Adobe Systems Incorporated (registered trademark). With this program, the moving image or the still image that is the output of the target program 15 is displayed on the display unit 22 of the client apparatus 20.

Figure 2:
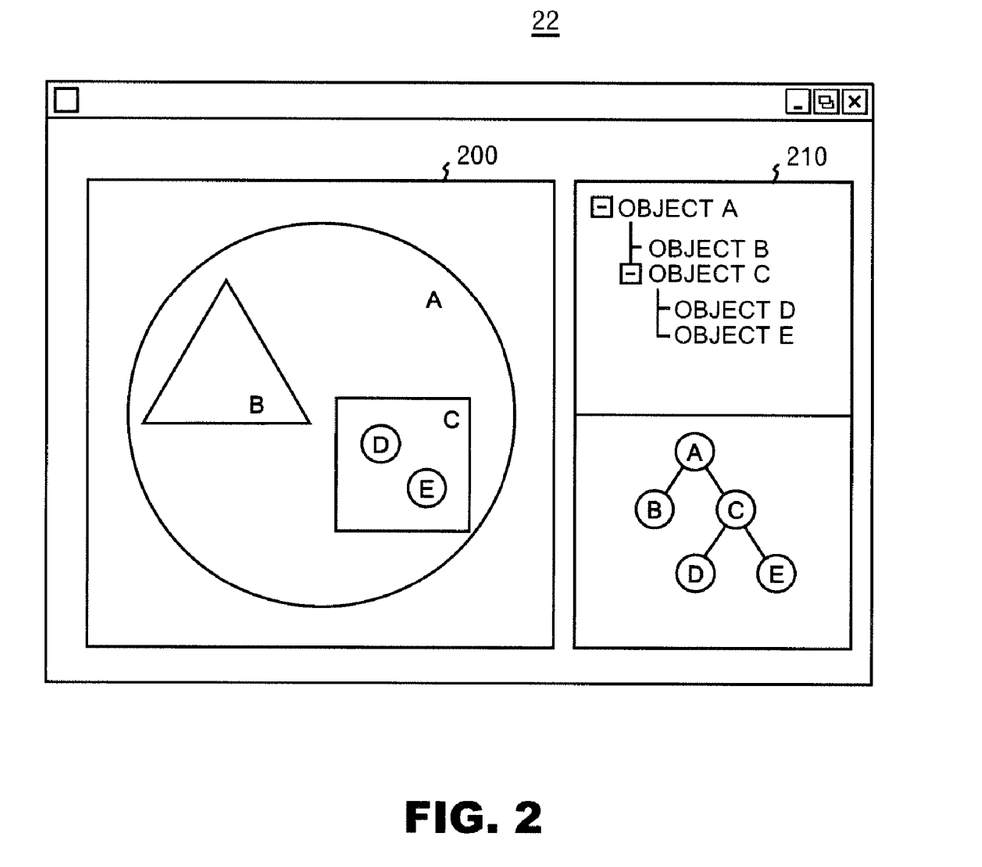
FIG. 2 shows a display example of a display unit 22 according to this embodiment.

FIG. 2 shows a display example of the display unit 22 according to this embodiment. The client apparatus 20 allows a Web browser such as Internet Explorer (registered trademark) of Microsoft Corporation (registered trademark) to operate therein, and the display unit 22 displays the screen of the Web browser. The display unit 22 displays two windows, that is, a first window 200 and a second window 210, for example, inside the screen. The first window 200 displays the output of the target program 15. The target program 15 outputs multiple display objects in a certain structure (for example, in a hierarchical structure called the z order or the like), as shown in FIG. 2. In an example shown in FIG. 2, display objects B and C are displayed on the front side of a display object A in an overlapping manner, and moreover, display objects D and E are displayed on the front side of the display object C in an overlapping manner. If this image is a moving image, the structure of the display objects may dynamically change.

On the other hand, the second window 210 displays the output of the external program 12. The external program 12 analyzes the object structure used in internal processing of the target program 15, and outputs the analyzed structure. This structure is called, for example, a DOM (document object model) tree. The object structure used in the internal processing of the target program 15 may correspond to the hierarchical structure of the display objects that are the outputs of the target program 15. For instance, the second window 210 displays a structure indicating that the objects B and C are child objects of the object A, and that the objects D and E are child objects of the object C. However, this object structure is an object structure only used in the internal processing, and accordingly is not always identical to the structure of the display objects shown in the first window 200.

Here, the target program 15 is sometimes not a text file of DHTML, Ajax, JavaScript or the like, but is a binary file compiled in advance, such as a Flash Action Script program. In this case, in the client apparatus 20, the external program 12 is not allowed to refer to source codes of the target program 15 for the purpose of analyzing operations of the target program 15. The source codes may become referable if the target program 15 is decompiled. However, the decompiling is sometimes prohibited in accordance with the license agreements or the like. Moreover, in some cases, an object used in the internal processing of the target program 15 dynamically changes with the execution of the target program 15. For this reason, it is very difficult for the external program 12 to analyze the object structure used in the internal processing of the target program 15 in operations even though the external program 12 can refer to the source codes.

To address this problem, the information system 10☐according to this embodiment☐transmits a monitor program together with the target program 15 to the client apparatus 20 when the client apparatus downloads the target program 15. The monitor program is a program facilitating the operation analysis of the target program 15. Thereby, the information system 10 causes the client apparatus 20 to execute these two programs in parallel. The monitor program aims to facilitate the operation analysis of the target program 15 without violating the license agreement or the like, even in a case where it is difficult to analyze the operation contents of the target program 15 compiled in advance. Herein below, description will be provided mainly for processing in which the relay apparatus 40 causes the client apparatus 20 to download the target program 15.

Figure 3:
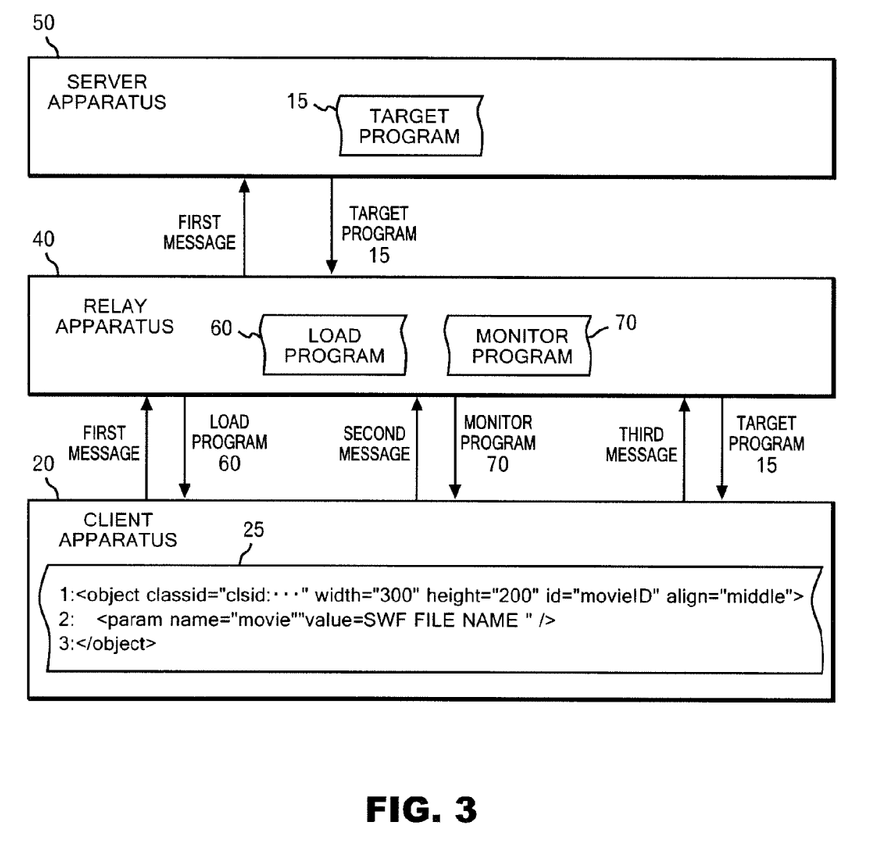
FIG. 3 shows a specific example of communications between a client apparatus 20, a relay apparatus 40 and a server apparatus 50 according to this embodiment.

FIG. 3 shows a specific example of communications among the client apparatus 20, the relay apparatus 40 and the server apparatus 50 according to this embodiment. The client apparatus 20 downloads an HTML document 25 from the server apparatus 50, and renders the contents. As shown in FIG. 3, the HTML document 25 includes object tags. The object tags indicate an instruction to insert an image object such as a Flash movie clip into a location where the object tags are written. In FIG. 3, a file name of a file providing a Flash movie clip is designated by use of the object tags. This file is called a SWF file since it has a SWF file format. Besides the file name, a display format of the inserted image object, for example, the size or the position of the display area can be designated in the object tags.

Here, the following description is given on the assumption that a character string of "http://XXX.com/foo.swf?x=30 &y=50" is designated in the part of the SWF file name.

The client apparatus 20 rendering this HTML document 25 determines that the URL part in this character string, i.e., "http://XXX.com/foo.swf" represents the file name of the target program 15. Thereafter, the client apparatus 20 transmits a first message making a request for the target program 15 to the server apparatus 50 via the relay apparatus 40. In other words, the server apparatus 50 functions as a Web site having a domain name of this "http://XXX.com/."

The Web browser in the client apparatus 20 is set to use the relay apparatus 40 as a proxy server for an HTTP message by a function of the external program 12 or the like. Accordingly, instead of the server apparatus 50, the relay apparatus 40 receives the first message. In response to the receipt of this message, the relay apparatus 40 causes the client apparatus 20 to execute the load program 60 by returning the load program 60 to the client apparatus 20 in the place of the target program 15. This load program 60 is a program requesting the target program 15 and a monitor program 70 for monitoring the operations of the target program 15. In addition to this, the relay apparatus 40 obtains the target program 15 from the server apparatus 50 by forwarding this received first message to the server apparatus 50, and then stores the target program 15 in a memory device.

By executing the load program 60, the client apparatus 20 sequentially transmits a second message requesting the monitor program 70 and a third message again requesting the target program 15 to the server apparatus 50. The relay apparatus 40 receives these second and third messages instead of the server apparatus 50. In response to the receipt of the second message, the relay apparatus 40 reads out the previously-stored monitor program 70 from the memory device irrespective of the destination of the message and returns the monitor program 70 to the client apparatus 20. In addition, in response to the receipt of the third message, the relay apparatus 40 reads out the target program 15, this has already been obtained by forwarding the first message, from the memory device, and returns the target program 15 to the client apparatus 20. In this way, the client apparatus 20 is enabled to cause both the target program 15 and the monitor program 70 to operate in parallel.

Figure 4:
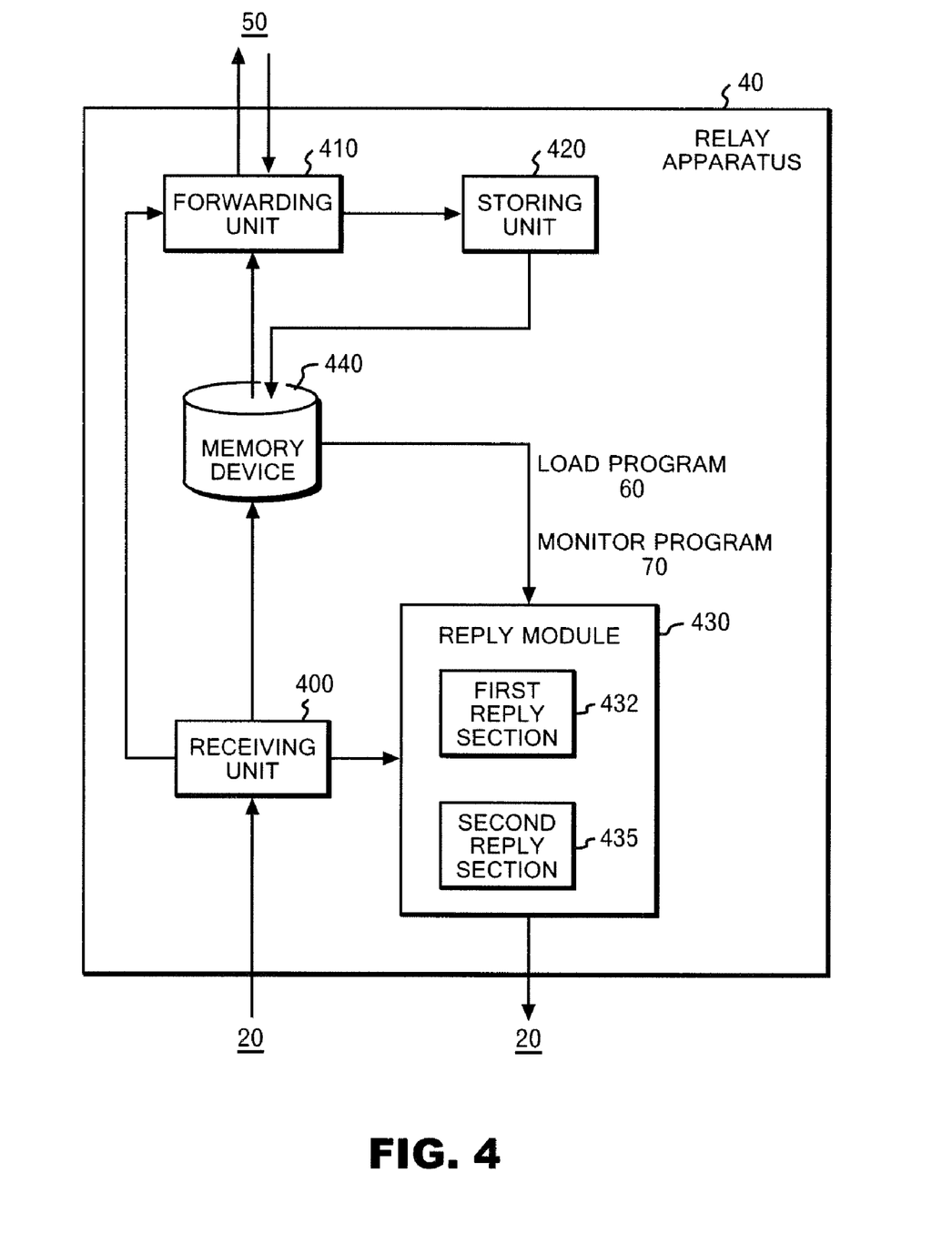
FIG. 4 shows a functional configuration of the relay apparatus 40 according to this embodiment.

FIG. 4 shows a functional configuration of the relay apparatus 40 according to this embodiment. The relay apparatus 40 functions as a receiving unit 400, a forwarding unit 410, a storing unit 420 and a reply module 430 by executing an installed program by use of a CPU 1000, a RAM 1020 and the like, which will be described later. Moreover, the relay apparatus 40 includes a memory device 440 implemented, for example, by use of a later-described hard disk drive 1040. These units have basic functions as a so-called proxy server of a Web server. The specific functions are as follows.

Instead of the server apparatus 50, the receiving unit 400 receives a message transmitted from the client apparatus 20 to the server apparatus 50. The message is one requesting a program to be operated on the client apparatus 20. The forwarding unit 410 obtains the requested program from the server apparatus 50 by forwarding the received message to the server apparatus 50. Then, the storing unit 420 stores the obtained program in the memory device 440. The reply module 430 reads out the program from the memory device 440, and returns the program to the client apparatus 20. When the same program is again requested, the reply module 430 reads out the program from the memory device 440, and immediately returns the program. Thus, a waiting time for replay in the client apparatus 20 can be saved.

The memory device 440 stores the program, which the server apparatus 50 returns to the client apparatus 20 via the relay apparatus 40 in response to the request from the client apparatus 20, while associating the program with identification information of the program. One example of this is shown in FIG. 5.

Figure 5:
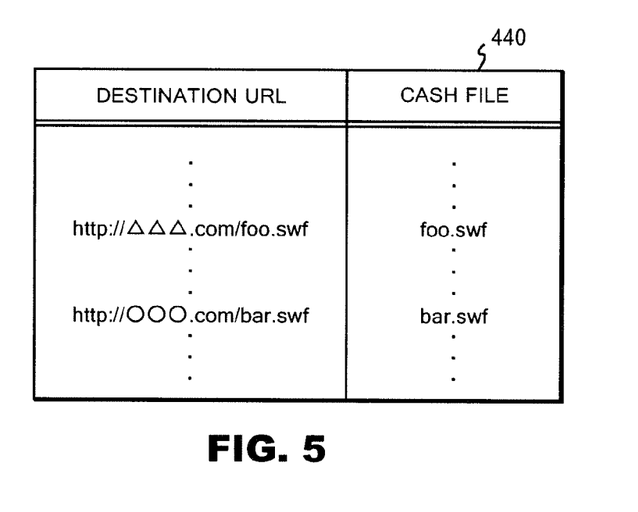
FIG. 5 shows one example of a data structure of a memory device 440 according to this embodiment.

FIG. 5 shows one example of a data structure in the memory device 440 according to this embodiment. The memory device 440 stores, as one example of the identification information of the program, a URL (uniform resource locator) that is a destination of a message for obtaining the program. In addition, the memory device 440 stores the program, itself, in association with the URL. For instance, the program obtained from the destination of "http://XXX.com/foo.swf" is stored with the file name of "foo.swf" in the memory device 440. In this way, the memory device 440 stores URLs in association with programs, and thereby the replay module 430 can search for a program from the memory device 440 by using the URL as a key.

Here, the description returns to FIG. 4. The reply module 430 has not only a function of executing processing for simply returning, to the client apparatus 20, a program stored in the memory device 440, but also a function of returning the target program 15 together with the monitor program 70 when the target program 15 is requested. More precisely, the reply module 430 includes a first reply section 432 and a second reply section 435. The first reply section 432 determines whether the first message received by the receiving unit 400 requests the target program 15 which satisfies a specific requirement. This specific requirement is that the target program 15 is the first program out of multiple programs which are sequentially requested of the server apparatus 50 by the client apparatus 20 and are to be executed in parallel in the client apparatus 20.

This determination as to the specific requirement is made by comparing, for example, identification information, which is included in a message and thus received by the receiving unit 400, with the destination URLs stored in the reply module 430. To be more precise, the receiving unit 400 receives a message requesting the target program 15, the message including the identification information of another program (called a requesting program) requesting the target program 15. This identification information is a setting value of, for example, a "Referer:" data field in HTTP. In other words, when a certain program (called a first program) operating on the Web browser of the client apparatus 20 requests another program (called a second program), the identification information of the first program is set in the "Referrer:" data field in the message requesting the second program. When one requesting the target program 15 is not a program recorded in a SWF file but an HTML document, the URL or the like of this HTML document is set in this data field.

Then, the first reply section 432 searches a destination URL field of the memory device 440 to find the identification information of the requesting program, which is received as included in the message. If the identification information is found, this indicates that the requesting program operating on the browser of the client apparatus 20 has already requested the target program 15. On the other hand, if the identification information is not found, this indicates that this message is not transmitted by the requesting program, but transmitted by means of another way, for example, by rendering an HTML document. Accordingly, on condition that the identification information is not found in the memory device 440, the first reply section 432 determines that the target program 15 is the initial program out of the multiple programs, which are to operate in parallel in the client apparatus 20. This is because, if the target program 15 is not the initial program, a certain program should have already been downloaded to the client apparatus 20 before this time.

Then, on condition that the target program 15 is the initial program, the first reply section 432 returns the load program 60 instead of the target program 15 to the client apparatus 20, and thus causes the client apparatus 20 to execute the load program 60. The load program 60 is for requesting the target program 15 and the monitor program 70 that functions to monitor the operations of the target program 15. Moreover, in parallel with the processing in which the relay apparatus 40 returns the load program 60, the storing unit 420 may obtain the target program 15 from the server apparatus 50, and store the target program 15 in the memory device 440. One example of the load program 60 returned by the relay apparatus 40 is shown in FIG. 6.

Figure 6:
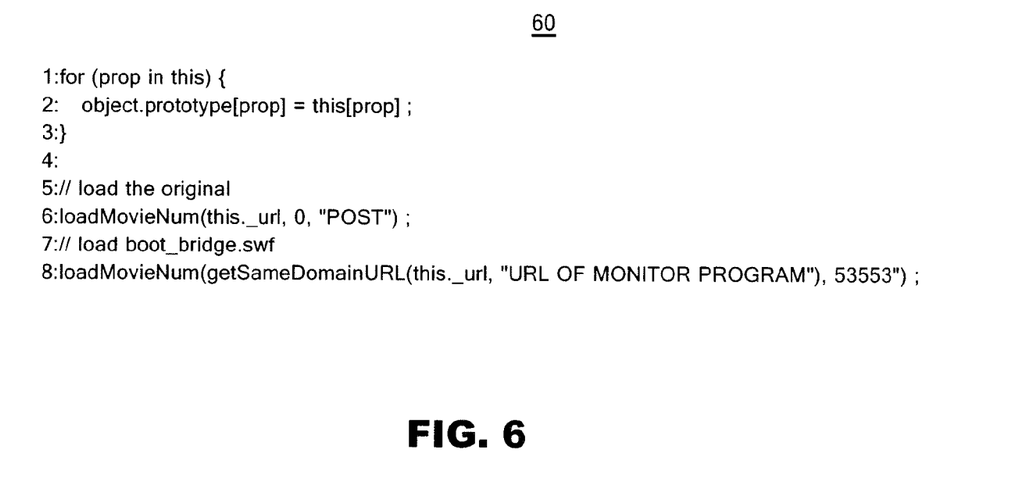
FIG. 6 shows one example of a load program 60 according to this embodiment.

FIG. 6 shows the example of the load program 60 according to this embodiment. The load program 60 is a program that requests an Action Script program providing a Flash movie clip, and is written itself in Action Script. First of all, the commands of 5th to 8th lines are explained here. The 6th line shows a command to request the target program 15. This command is, for example, a loadMovieNum command in Action Script. The URL of a requested destination is given to the first argument of this command.

As for details of the first argument, this is an operator referring to this load program 60 itself as an object, and this._url indicates the destination URL of the message that has been transmitted to obtain this load program 60. Although the relay apparatus 40 returns the load program 60 instead of the requested target program 15, the client apparatus 20 originally requests the target program 15. For this reason, "this._url" indicates the URL of the target program 15, for example, "http://XXX.com/foo.swf."

The second argument specifies the level for loading a requested movie clip. A Flash movie clip can be loaded, for example, at any one of levels 0 to a certain numeral value (the maximum value of double precision IEEE-754). The level 0 is a special level. On condition that the target program 15 is loaded at the level 0, the operations of all the programs including the load program 60 (all the programs recorded in the SWF files) already operating at the level 0 is terminated. The third argument is an optional element. If specified, the third argument indicates an attribute that is to be set in an HTTP request. By assigning a character string "POST" to the third argument, the first reply section 432 causes the client apparatus 20 to transmit a second message with a POST attribute of HTTP set in the second message. (Incidentally, when a character string "GET" is assigned to the third argument, a software cache function provided to the Web browser sometimes prohibits the HTTP request from reaching the relay apparatus 40.)

The 8th line shows a command to request the monitor program 70. This command is also a loadMovieNum command in ActionScript as similar to the 6th line. However, in this command, a first argument and a second argument are different from those of the 6th line, and the third argument is not set. More specifically, a character string "getSameDomainURL(this._url, "URL of the monitor program")" is set as the first argument. The function "getSameDomainURL" takes two arguments, and combines the domain part of the URL given by the first argument, with the URL given by the second argument except for the domain part thereof, and then outputs the resultant URL.

Thus, the output of this function is the URL obtained by combining the domain part of the URL of the target program 15 with the URL of the monitor program 70 except for the domain part. Accordingly, the command of the 8th line is a command to make a request to the server apparatus 50 for the monitor program 70 stored in the relay apparatus 40 in fact. Thus, the load program 60 is capable of causing both the target program 15 and the monitor program 70 to be requested by use of the URLs in the same domain as the destinations, and also to operate in parallel in the client apparatus 20. Incidentally, the second argument is the same as the above example. However, the level specified in the second argument is preferably set to be different from the levels of other programs to be loaded later with the operations of the target program 15. In the example in FIG. 6, the level 53553 is set as a level that is unlikely to be used in general.

As a result of an execution of the above commands, upon completion of an execution of the load program 60, the target program 15 and the monitor program 70 operate in the client apparatus 20 as if these programs 15 and 70 were downloaded from URLs having the same domain.

Next, the command of 1st to 3rd lines will be described below. Before the execution of the target program 15 requested with the first message by the client apparatus 20, input parameters are sometimes given to the target program 15. For example, when the first message includes a character string "http://XXX.com/foo.swf?x=30&y=50" as the destination URL, variable values after "?" is input parameters. When the relay apparatus 40 returns the load program 60 instead of the target program 15, these input parameters are given to the load program 60 instead of the target program 15 in the client apparatus 20. The command of the 1st to 3rd lines is a command to give, as new input parameters, the input parameters which are thus given to the load program 60, to the target program 15 to be requested through the execution of the load program 60.

This command is realized by assigning an input parameter to a prototype of Object, for example. ActionScript is a prototype based object oriented language like ECMA Script or the like. All objects writable in a program are subclasses of a special class named Object class. Moreover, the Object class includes a data field named a prototype. The prototype is a field referable from all subclasses of the Object class. For example, when a particular object is stored in a prototype, and if another object having the same name as the particular object is not defined in any subclass, the particular object is referable as a method or a field of its subclass.

The command of the 1st to 3rd lines assigns an input parameter (this [prop]) given to the load program 60, into the prototype of Object by use of such a characteristic of the prototype of Object. With this assignment, the input parameter is made referable from the target program 15, which is to be loaded later. This is because any object defined in the target program 15 to be loaded later is a subclass of the class named Object.

When the prototype of Object is used to assign an input parameter there into, the following effects can be obtained. First, the relay apparatus 40 does not have to analyze what input parameter is assigned to the load program 60. A type and the number of input parameters given to the load program 60 depend on an HTML document that calls the load program 60. In the command example in FIG. 6, all input parameters can be collectively inputted to the target program 15, whatever input parameters are given. Secondly, an input parameter can be given in advance before the target program 15 starts operating. By use of any other method, the input parameter given to the load program 60 probably has to be assigned to an object generated in the target program 15 after the target program 15 starts operating. In this case, a timing of assigning the parameter may delay, and such delay may cause the target program 15 to malfunction. In contrast, the present method allows input parameters to be given to the target program 15 in advance before the target program 15 starts operating, and thereby allows the target program 15 to operate surely and normally.

The description returns to FIG. 4, here. The second reply section 435 determines whether or not a second message received after the first message requests the monitor program 70. On condition that the second message requests the monitor program 70, the second reply section 435 neither obtains the monitor program 70 from the server apparatus 50 nor returns the obtained monitor program 70. Instead, the second reply section 435 returns the monitor program 70 previously stored in the memory device 440 or the like, to the client apparatus 20, and thereby causes the client apparatus 20 to execute the monitor program 70. On the other hand, if a third message received after the first message requests the target program 15, the replay module 430 normally operates. More precisely, in this case, the second reply section 435 causes the client apparatus 20 to execute the target program 15 by returning the target program 15 read from the memory device 440 to the client apparatus 20. In this way, the client apparatus 20 can cause the target program 15 and the monitor program 70 to operate concurrently in response to the request from the load program 60.

Hereinafter, with reference to FIGS. 7 and 8, description will be given for one example of collaborative operations of the external program 12, the target program 15 and the monitor program 70.

Figure 7:
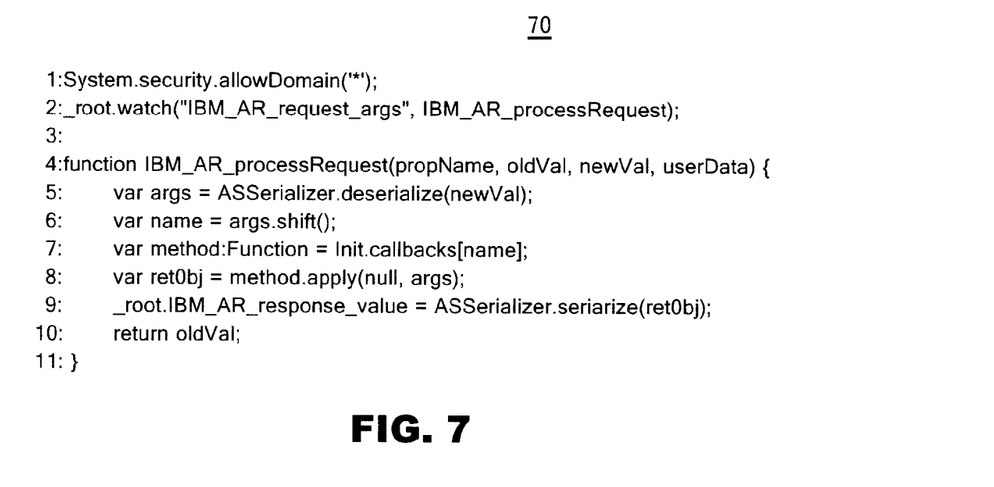
FIG. 7 shows one example of a monitor program 70 according to this embodiment.
Figure 8:
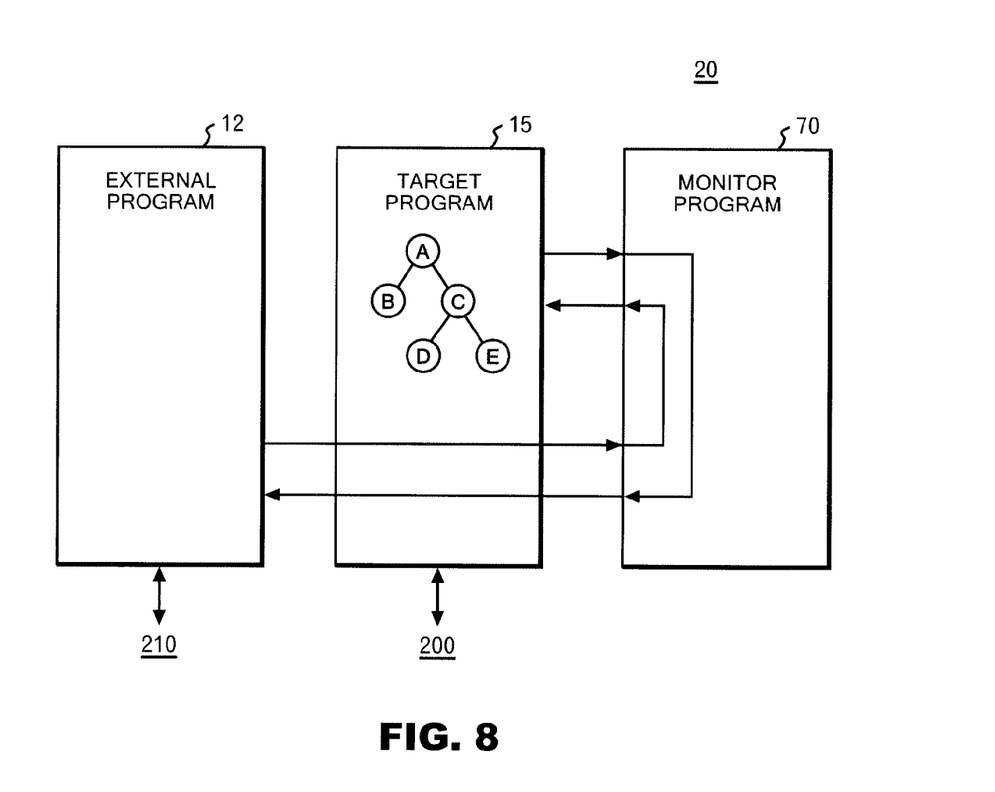
FIG. 8 shows one example of collaborative operations of an external program 12, a target program 15 and the monitor program 70 according to this embodiment.

FIG. 7 shows one example of the monitor program 70 according to this embodiment. FIG. 8 shows one example of the collaborative operations of the external program 12, the target program 15 and the monitor program 70 according to this embodiment. The 1st line in FIG. 7 shows a security setting for access control. The command of the 1st line allows the external program 12 to refer to an object in the monitor program 70. The 2nd line shows a setting for calling a function named IBM_AR_processRequest (hereinafter, called a handler) when a value of the variable "IBM_AR_request_args" is changed. Then, the entity of the function is defined in the 4th to 11th lines.

First, a process of calling this function is explained. For example, by executing the following Java script command, the external program 12 can assign a value to a variable in the monitor program 70 that is to operate in parallel with the external program 12☐ document.getElementsByTagName("object")[0].SetVariable('x',50);

Here, 'x' is the name of a variable having a value to be changed. Then, "object" is an HTML tag name indicating a Flash player that runs a Flash content (here, for example, the monitor program 70) having the variable, and 50 is a value to be set. Accordingly, the forgoing handler defined in the monitor program 70 can be called by issuing a command in which '_level53553.IBM_AR_request_args' is set instead of the above 'x' through the execution of the external program 12. Note that "_root" is an identifier indicating, as an object, a program operating at the level 0, i.e., for example, the identifier indicating the target program 15.

Next, the processing in a case where the handler is called is described. With the function of the watch method in the 2nd line in FIG. 7, the handler is called with arguments, at least a variable name (propName) having a value changed, the old value (oldVal) before the change and the new value (newVal) after the change. This argument list is as shown in the argument definitions in the 4th line, for example. Then, in the 5th line, this new value is deserialized.

The serialization and deserialization are known concepts, and roughly mean as follows☐The serialization indicates processing of transforming multiple objects, which are referred to during the execution of one program, into a data format transferable to another program. During execution of a program, multiple objects are stored in various structures such as an array structure and a list structure in order to improve the processing efficiency or the like. For example, there is a case where, in the list structure, a first object refers to an address on a memory having a second object stored therein.

In this case, if a first program forwards these objects to a second program, a problem may occur. This problem is caused by a fact that the address to which the object is stored in the memory is different between the first and second programs. As a result, in the second program, the first object cannot refer to the second object properly. Against such situation, the serializing processing allows multiple objects to be transformed into, for example, a data format excluding references made by use of addresses. Incidentally, the deserialization indicates an inverse transformation of the forgoing serializing transformation.

Here, the description is provided on the assumption that numeric values obtained by serializing multiple variables in advance are assigned to the arguments newVal. More precisely, assuming that the external program 12 generates multiple variables to be outputted to the target program 15, serializes these multiple variables, and assigns the resultant numeric values into the variable "IBM_AR_request_args" via the foregoing SetVariable command, the description for FIG. 7 is continued.

As a result of the deserialization shown in the 5th line, multiple variables set by the external program 12 are correctly set in the variable args. The 6th line shows processing in which the first variable is firstly read out from the multiple variables expressed in the variable args, and in which then the variable args is changed to the variable indicating the second and subsequent variables of the multiple variables. As a result of this processing, the value of the first variable is assigned to the variable name. The 7th line shows processing in which a method having a method name indicated by the variable name is assigned to the variable method indicating the method. Note that Init.callbacks[name] indicates to read out a pointer and the entity of the method having the method name indicated by the variable name.

The 8th line shows processing in which a method assigned to the variable method is executed by using, as arguments, the multiple variables expressed in the variable args. A return value from the executed method is assigned to a variable retObj. Any of the methods defined in the monitor program 70 or the target program 15 may be called here. In other words, the external program 12 can call any method defined in the target program 15 or the monitor program 70 only by setting "IBM_AR_request_args" to have a name and arguments of the method. For example, if a method of changing an object in the target program 15 operating in the client apparatus 20 is defined in the monitor program 70, the external program 12 can change the object by calling this method.

The subsequent 9th line shows processing of serializing the value of the variable retObj and of assigning the resultant value to the variable IBM_AR_response. Thus, for example, by executing the following command, the external program 12 can obtain a return value from the method executed by the monitor program 70☐ document.getElementsByTagName("object")[0].GetVariable('_level53553.IBM_AR_response_value');

With this command, the external program 12 is allowed to refer to objects in the target program 15. In other words, for example, a method calling an object in the target program 15 operating in the client apparatus 20 only needs to be defined in the monitor program 70. Thereby, by calling the defined method, the external program 12 can cause the monitor program 70 to output the object, as a value of the variable "IBM_AR_response_value," to the external program 12, As described above, the collaboration between the external program 12 and the monitor program 70 allows the external program 12 not only to refer to an object defined in the target program 15, but also to arbitrarily operate and even to change the object in the target program 15. Moreover, those skilled in the art and referring to this embodiment may understand that it is possible to implement communications in the inversed direction, in which, for example, the monitor program 70 causes the execution of a command defined in the external program 12. To be more precise, the external program 12, for example, periodically reads out a variable value defined in the monitor program 70, and determines whether the variable value is changed or not. Then, when the variable value is changed, the external program 12 executes processing based on an instruction indicated by the new variable from the monitor program 70. This variable value indicates, for example, a method name and numeral values obtained by serializing its arguments as described above. In other words, in this case, the monitor program 70 can cause the external program 12 to perform a desirable operation, by changing the variable value of a variable defined in the monitor program 70 to a variable value indicating an instruction to the external program 12.

Figure 9:
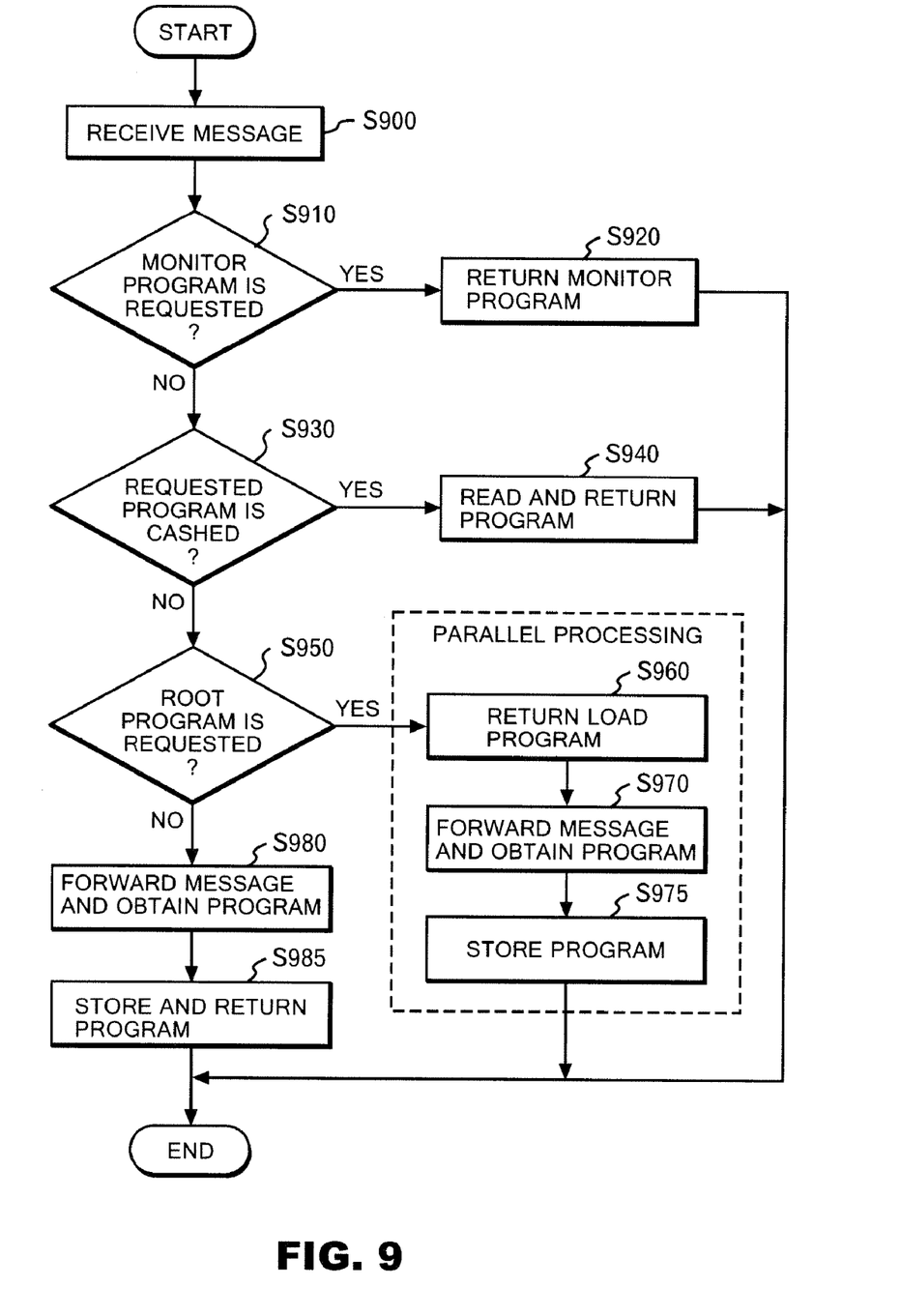
FIG. 9 is flowchart showing a process performed by the relay apparatus 40 according to this embodiment.

FIG. 9 is a flowchart showing processing performed by the relay apparatus 40 according to this embodiment. Instead of the server apparatus 50, the receiving unit 400 receives a message from the client apparatus 20 (S900). This message is originally sent from the client apparatus 20 to the server apparatus 50 in order to request a program to be operated in the client apparatus 20. Then, the second reply section 435 determines whether or not the received message is a message requesting the monitor program 70 (S910). If the received message is the message requesting the monitor program 70 (S910: YES), the second reply section 435 reads out the monitor program 70 from the memory device 440, and returns the monitor program 70 (S920).

On the other hand, if the message is not the message requesting the monitor program 70 (S910: NO), the first reply section 432 determines whether or not the requested program has already been stored in the memory device 440 (S930). For example, when the forwarding unit 410 has already obtained the target program 15 by requesting the target program 15 from the server apparatus 50, the target program 15 has been stored in the memory device 440 by the storing unit 420. If the requested program has been stored in the memory device 440 (S930: YES) as described above, the first reply section 432 reads out the program from the memory device 440 and returns the program to the client apparatus 20 (S940).

On the other hand, if the requested program is not stored in the memory device 440 (S930: NO), the first reply section 432 determines whether or not this message is a message requesting a program corresponding to the root node in a call tree that indicates a call relation among the programs (S950). This determination can be made by comparing, for example, the "Referer:" data field in the HTTP message with the URLs stored in the memory device 440, as already described. The program corresponding to this root node is the aforementioned target program 15.

In addition to this, in S950, the first reply section 432 may also determine whether or not the requested program is an ActionScript program. For example, the first reply section 432 causes the forwarding unit 410 to forward the received message to the server apparatus 50, and thereby obtains several leading bytes of binary data indicating the requested program. The several leading bytes include a header part indicating a type of this program. The first reply section 432 compares this header part with a predetermined byte string indicating the ActionScript program. If they match with each other, this program can be determined as an ActionScript program. According to this determination, the first reply section 432 can cause only ActionScript programs to be targeted for monitoring by monitor program 70.

Thereafter, if the received message is the message requesting the target program 15 (S950: YES), the first reply section 432 returns the previously-stored load program 60 to the client apparatus 20 instead of performing processing of returning the target program 15 (S960). After or in parallel with this returning processing, the forwarding unit 410 obtains the target program 15 from the server apparatus 50 by forwarding the received message to the server apparatus 50 (S970). Thereafter, the storing unit 420 stores the obtained target program 15 in the memory device 440 (S975).

On the other hand, if the received message is not the message requesting the program corresponding to the root node (S950), the relay apparatus 40 functions as a normal proxy server. In other words, the forwarding unit 410 obtains the program from the server apparatus 50 by forwarding the received message to the server apparatus 50 (S980). Then, the storing unit 420 stores the obtained program in the memory device 440 and the reply module 430 concurrently returns the program to the client apparatus 20 (S985).

The relay apparatus 40 repeats the foregoing processing every time receiving a message requesting a program.

Figure 10:
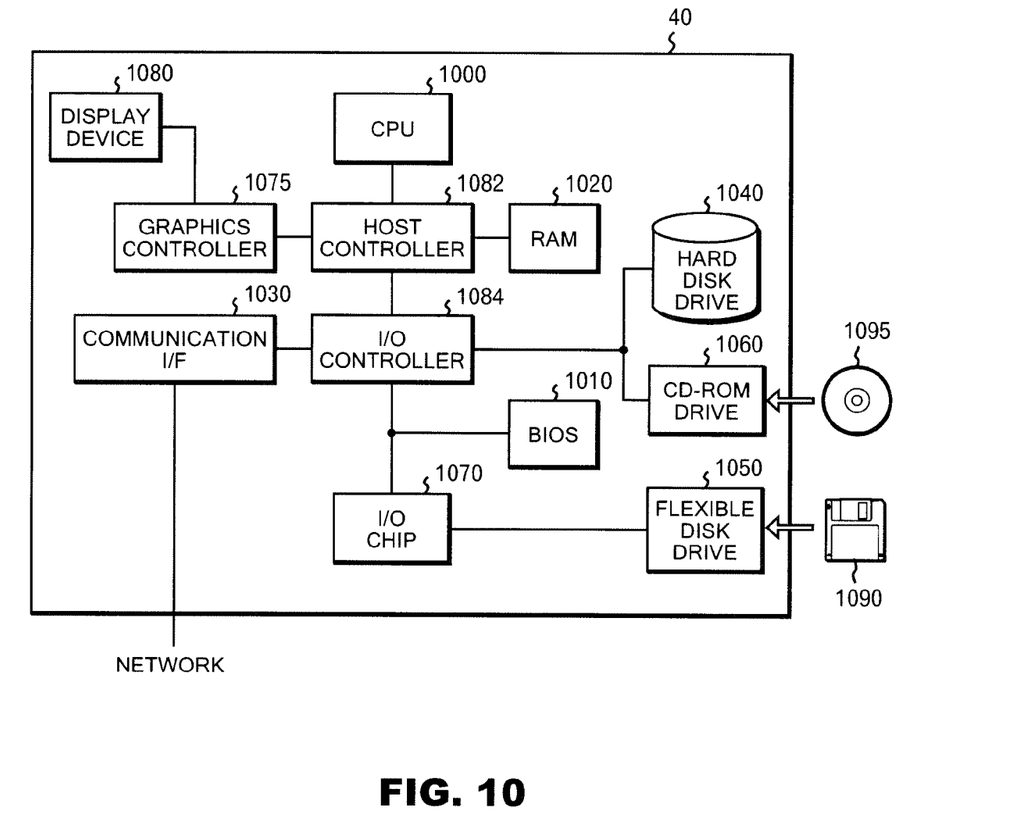
FIG. 10 shows a functional configuration of a computer that operates as the relay apparatus 40 according to this embodiment.

FIG. 10 shows a functional configuration of a computer that operates as the relay apparatus 40 according to this embodiment. The computer includes a CPU peripheral unit, an input/output unit and a legacy input/output unit. The CPU peripheral unit includes the CPU 1000, the RAM 1020 and a graphics controller 1075, all of which are connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes BIOS 1010, a flexible disk drive 1050 and an input/output chip 1070, all of which are connected to the input/output controller 1084.

The host controller 1082 connects the RAM 1020 to the CPU 1000 and the graphics controller 1075, both of which access the RAM 1020 at a high transfer rate. The CPU 1000 operates in accordance with programs stored in the BIOS 1010 and in the RAM 1020, and controls each of the components. The graphics controller 1075 obtains image data that the CPU 1000 or the like generates in a frame buffer provided in the RAM 1020, and causes a display device 1080 to display the obtained image data. Instead of this, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 communicates with an external device via a network. In the hard disk drive 1040, programs and data used by the computer are stored. The CD-ROM drive 1060 reads a program or data from a CD-ROM 1095, and provides the RAM 1020 or the hard disk 1040 with the read-out program or data.

Moreover, the input/output controller 1084 is connected to relatively low-speed input/output devices such as the BIOS 1010, the flexible disk drive 1050 and the input/output chip 1070. In the BIOS 1010, stored are programs such as a boot program executed by the CPU 1000 at a start-up time of the computer and a program depending on hardware of the computer. The flexible disk drive 1050 reads a program or data from a flexible disk 1090, and provides the read-out program or data to the RAM 1020 or the hard disk drive 1040 via the input/output chip 1070. The input/output chip 1070 is connected to the flexible disk drive 1050 and various kinds of input/output devices via, for example, a parallel port, a serial port, a keyboard port, a mouse port and the like.

A program to be provided to the computer is provided by a user with the program stored in a storage medium such as the flexible disk 1090, the CD-ROM 1095 and an IC card. The program is read from the storage medium via the input/output chip 1070 and/or the input/output controller 1084, and is installed and executed on the computer. An operation that the program causes the computer and the like to execute, is identical to the operation of the relay apparatus 40 described by referring to FIGS. 1 to 9. Accordingly, the description thereof is omitted here.

The program described above may be stored in an external storage medium. As the storage medium, any one of the following media may be used: an optical recording medium such as a DVD and a PD; a magneto-optic recording medium such as an MD; a tape medium; and a semiconductor memory such as an IC card, in addition to the flexible disk 1090 and the CD-ROM 1095. Alternatively, the program may be provided to the computer via a network, by using, as the storage medium, a memory device such as a hard disk and a RAM, provided in a server system connected to a private communication network or to the Internet.

As described above, when the client apparatus 20 requests the target program 15 from the server apparatus 50, the relay apparatus 40 according to this embodiment allows the external program 12 to access objects used in the internal processing of the target program 15 in operation without decompiling, adding a command code to, and recompiling the target program 15. Thereby, the external program 12 can obtain information on, for example, a DOM tree indicating a hierarchy relationship among objects and the like. By use of this function, the below-shown various applications, for instance, can be implemented.

First of all, as a basic function, relationships of objects for the internal processing with display objects on the screen can be displayed on the screen of the display unit 22. More precisely, for example, in response to a click on a certain object in the second window 210 or the like in FIG. 2, the external program 12 can causes the display object corresponding to the certain object to be displayed in a highlighted manner on the first window 200. Moreover, in response to a click on an object for adjusting an output audio volume, for example, on the second window 210 in FIG. 2, the external program 12 can adjust the audio volume outputted together with a moving image on the first window 200. Besides these, in response to an operation on an object name displayed on the second window 210, the external program 12 can causes the target program 15 to operate as if the corresponding display object displayed on the first window 200 were clicked on. In this way, an alternative text-base interface can also be provided to moving image contents created with Flash or the like. This interface is widely applicable to a tool for analyzing the operations of the target program 15 for mash up, a tool for debugging the target program 15, or a tool for reading aloud pages for visually impaired people.

In addition, in some moving image contents such as Flash, display objects such as a button, image, text and check box are displayed as objects operable by a user. In order to deal with the situation where a Web browser does not support displaying of such display objects, an alternative text indicating what kind of functions are provided by the display objects may be written in an HTML document. However, it is up to a page creator to write such an alternative text. For this reason, there is a case where no alternative text is written or where an alternative text does not show a correct content even though it is written. Furthermore, moving image content sometimes includes a special object indicating a nested structure of elements or a group structure, which is not displayed on the screen. In this case, the function of this object cannot be understood correctly even with a text reading tool for visually-impaired people.

Even in such a case, as long as the instance name, class name or the like of an object used in the internal processing is identified corresponding to the display object, the function of the display object can be inferred. In other words, the external program 12 obtains the name of the object used in the internal processing of the target program 15 through the monitor program 70, and displays the text indicating the name. The text reading tool generates and outputs a speech in which the text is read aloud. In this way, when a user listens to the speech, the user can infer to some extent what kind of function is provided by the display object.

Moreover, as another example, the information such as a DOM tree indicating a hierarchy relationship of objects can also be used in itself. For example, the text reading tool is capable of reading aloud a text from the top to the end, if the text is written simply sequentially. However, since a Web page using Flash or the like has a hierarchy structure, it is difficult to determine an order of reading aloud display objects. In particular, in a case where binary codes such as Flash are downloaded by a browser, the browser has a difficulty even in correctly identifying the hierarchy structure of the binary codes. In contrast, use of the relay apparatus 40 according to this embodiment allows the browser to correctly identify at least the hierarchy structure, and thereby to determine a reading order in accordance with a certain rule such as the order from a parent object to a child object.

Moreover, in this embodiment, the same load program 60 and the same monitor program 70 may be used for whatever content the target program 15 has. In other words, whatever a program received as the target program 15, the relay apparatus 40 can transmit the predetermined load program 60 and monitor program 70 without changing the load program 60 and the monitor program 70 for each requested target program 15. This allows the relay apparatus 40 to operate at a higher speed, and thus reduces a time required after a user requests the target program 15 until the target program 15 starts operating.

Hereinabove, the present invention has been described by using the embodiment, but the technical scope of the present invention is not limited to the aforementioned embodiment. It is obvious to those skilled in the art that various modifications and improvements can be made in the aforementioned embodiment. It is obvious from the description of the scope of claims that any modified or improved embodiment is also included in the technical scope of the present invention.

The invention claimed is:

1. A relay apparatus that obtains a first program from a server apparatus and returns the obtained first program to a client apparatus by forwarding a first message received from the client apparatus to the server apparatus, the relay apparatus comprising:
- a receiving unit for receiving the first message from the client apparatus, the first message making a request to the server apparatus for the first program to be operated in the client apparatus;
- a first reply section for causing the client apparatus to execute a load program by providing the load program to the client apparatus, in response to a receipt of the first message requesting the first program, the load program requesting the first program and a monitor program for monitoring the first program, the load program being provided on condition that the first program requested via the first message is an initial program out of a plurality of programs that are sequentially requested of the server apparatus by the client apparatus and are to be executed in parallel in the client apparatus;
- a second reply section for causing the client apparatus to execute the monitor program by providing a previously-stored instance of the monitor program to the client apparatus on condition that a received second message requests the monitor program; and
- a storing unit for storing the first program in a memory device of the relay apparatus by obtaining the first program from the server apparatus in response to a receipt of the first message, the second reply section causing the client apparatus to execute the first program by providing the first program from the memory device of the relay apparatus on condition that a received third message requests the first program,
- wherein the client apparatus executes both the monitor program and the first program in parallel, the monitor program and the first program each being provided to the client apparatus via the relay apparatus,
- wherein the first program requested with the first message is recorded in a SWF file that provides a Flash movie clip; and the first reply section returns the load program on condition that the first message is not transmitted by a second program recorded in another SWF file operating in the client apparatus, but is transmitted by a Web browser in the client apparatus as a result of rendering a Hyper Text Markup Language (HTML) document;
- wherein each of the load program and the monitor program is an ActionScript program; in response to a receipt of the first message, the first reply section returns, as the load program, a same-domain program causing the client apparatus to make a request for the monitor program and the first program requested with the first message, by using as destinations URLs having the same domain; and on condition that the second message requests the monitor program, the second reply section returns the previously-stored instance of the monitor program regardless of the URL requested as a destination.

2. The relay apparatus according to claim 1, wherein the memory device is configured for storing identification information of the first program which the server apparatus returns to the client apparatus via the relay apparatus in response to a request from the client apparatus, wherein
- the receiving unit receives the first message requesting the first program, the first message including the identification information of a second program requesting the first program;
- the first reply section searches the memory device to find the identification information of the second program that is received as included in the first message; and
- on condition that the identification information is not found, the first reply section determines that a program requested with the first message is the initial program out of the plurality of programs.

3. The relay apparatus according to claim 1, wherein the second message is in conformity with Hyper Text Transfer Protocol (HTTP); and
- the first reply section returns, as the load program, a set attribute program of causing the client apparatus to set a POST attribute of HTTP in the second message and to transmit the second message.

4. The relay apparatus according to claim 1, wherein in the client apparatus, an input parameter to be given to the first program requested with the first message is given to the load program received instead of the first program; and
- the first reply section returns a command included in the load program, the command causing the input parameter given to the load program to be given to the first program requested through the execution of the load program.

5. The relay apparatus according to claim 1, wherein the second reply section returns a command included in the monitor program, the command making an object in the monitor program referable from another program that operates in parallel with the monitor program in the client apparatus.

6. The relay apparatus according to claim 2, wherein each of the load program, the first program and the monitor program is an ActionScript program providing a Flash movies clip;
- the load program is a parallelizing program causing the first program and the monitor program to operate in parallel in the client apparatus; and
- the monitor program also outputs, to another program, an object in the first program operating in parallel with the monitor program in the client apparatus.

7. The relay apparatus according to claim 2, wherein each of the load program, the first program and the monitor program is an ActionScript program providing a Flash movie clip;
- the load program is a parallelizing program causing the first program and the monitor program to operate in parallel in the client apparatus; and
- according to control of another program, the monitor program also changes an object in the first program operating in parallel with the monitor program in the client apparatus.

8. A system, comprising:
a client apparatus;
a server apparatus; and
a relay apparatus, the client apparatus being communicatively coupled with the server apparatus via the relay apparatus, the relay apparatus being communicatively coupled with both the client apparatus and the server apparatus, wherein the relay apparatus includes:
- a receiving unit for receiving a first message from the client apparatus, the first message making a request to the server apparatus for a first program to be operated in the client apparatus;
- a first reply section for causing the client apparatus to execute a load program by providing the load program from the relay apparatus to the client apparatus in response to a receipt of the first message requesting the first program, the load program requesting the first program and a monitor program for monitoring the first program;
- a second reply section for causing the client apparatus to execute the monitor program by providing a previously-stored instance of the monitor program from the relay apparatus to the client apparatus on condition that a received second message requests the monitor program;

wherein the client apparatus executes both the monitor program and the first program in parallel, the monitor program and the first program each being provided to the client apparatus via the relay apparatus;

wherein the first program requested with the first message is recorded in a SWF file that provides a Flash movie clip; and the first reply section returns the load program on condition that the first message is not transmitted by a second program recorded in another SWF file operating in the client apparatus, but is transmitted by a Web browser in the client apparatus as a result of rendering a Hyper Text Markup Language (HTML) document;

wherein each of the load program and the monitor program is an ActionScript program; in response to a receipt of the first message, the first reply section returns, as the load program, a same-domain program causing the client apparatus to make a request for the monitor program and the first program requested with the first message, by using as destinations URLs having the same domain; and on condition that the second message requests the monitor program, the second reply section returns the previously-stored instance of the monitor program regardless of the URL requested as a destination.

9. A method for obtaining a target program at a relay apparatus from a server apparatus and providing the obtained target program to a client apparatus via the relay apparatus by forwarding a first message received from the client apparatus to the server apparatus, the method comprising the steps of:

receiving the first message from the client apparatus at the relay apparatus, the first message making a request to the server apparatus for the target program to be operated in the client apparatus;

causing the client apparatus to execute a load program by providing the load program from the relay apparatus to the client apparatus in response to a receipt of the first message requesting the target program, the load program requesting the target program and a monitor program for monitoring the target program;

forwarding the first message from the relay apparatus to the server apparatus;

receiving the target program at the relay apparatus, the target program being provided from the server apparatus;

storing the target program in a memory device of the relay apparatus;

receiving a second message at the relay apparatus from the client apparatus, the second message requesting the monitor program;

causing the client apparatus to execute the monitor program by providing a previously-stored instance of the monitor program from the relay apparatus to the client apparatus;

receiving a third message at the relay apparatus from the client apparatus, the third message requesting the target program; and causing the client apparatus to execute the target program in parallel with the monitor program by providing the stored target program from the memory device of the relay apparatus to the client apparatus;

wherein the target program requested with the first message is recorded in a SWF file that provides a Flash movie clip; and a first reply section returns the load program on condition that the first message is not transmitted by a second program recorded in another SWF file operating in the client apparatus, but is transmitted by a Web browser in the client apparatus as a result of rendering a Hyper Text Markup Language (HTML) document;

wherein each of the load program and the monitor program is an ActionScript program; in response to a receipt of the first message, the first reply section returns, as the load program, a same-domain program causing the client apparatus to make a request for the monitor program and the target program requested with the first message, by using as destinations URLs having the same domain; and on condition that the second message requests the monitor program, a second reply section returns the previously-stored instance of the monitor program regardless of the URL requested as a destination.

10. A non-transitory computer-readable storage medium which stores a setup program causing a relay apparatus to perform a method, said method comprising:

receiving a first message from a client apparatus at the relay apparatus, the first message making a request to a server apparatus for a target program to be operated in the client apparatus;

causing the client apparatus to execute a load program by providing the load program from the relay apparatus to the client apparatus in response to a receipt of the first message requesting the target program, the load program requesting the target program and a monitor program for monitoring the target program;

forwarding the first message from the relay apparatus to the server apparatus;

receiving the target program at the relay apparatus, the target program being provided from the server apparatus;

storing the target program in a memory device of the relay apparatus;

receiving a second message at the relay apparatus from the client apparatus, the second message requesting the monitor program;

causing the client apparatus to execute the monitor program by providing a previously-stored instance of the monitor program from the relay apparatus to the client apparatus;

receiving a third message at the relay apparatus from the client apparatus, the third message requesting the target program; and causing the client apparatus to execute the target program in parallel with the monitor program by providing the stored target program from the memory device of the relay apparatus to the client apparatus, wherein the target program requested with the first message is recorded in a SWF file that provides a Flash movie clip; and a first reply section returns the load program on condition that the first message is not transmitted by a second program recorded in another SWF file operating in the client apparatus, but is transmitted by a Web browser in the client apparatus as a result of rendering a Hyper Text Markup Language (HTML) document;

wherein each of the load program and the monitor program is an ActionScript program; in response to a receipt of the first message, the first reply section returns, as the load program, a same-domain program causing the client apparatus to make a request for the monitor program and the target program requested with the first message, by using as destinations URLs having the same domain; and on condition that the second message requests the monitor program, a second reply section returns the previously-stored instance of the monitor program regardless of the URL requested as a destination.

* * * * *